UNITED STATES PATENT OFFICE.

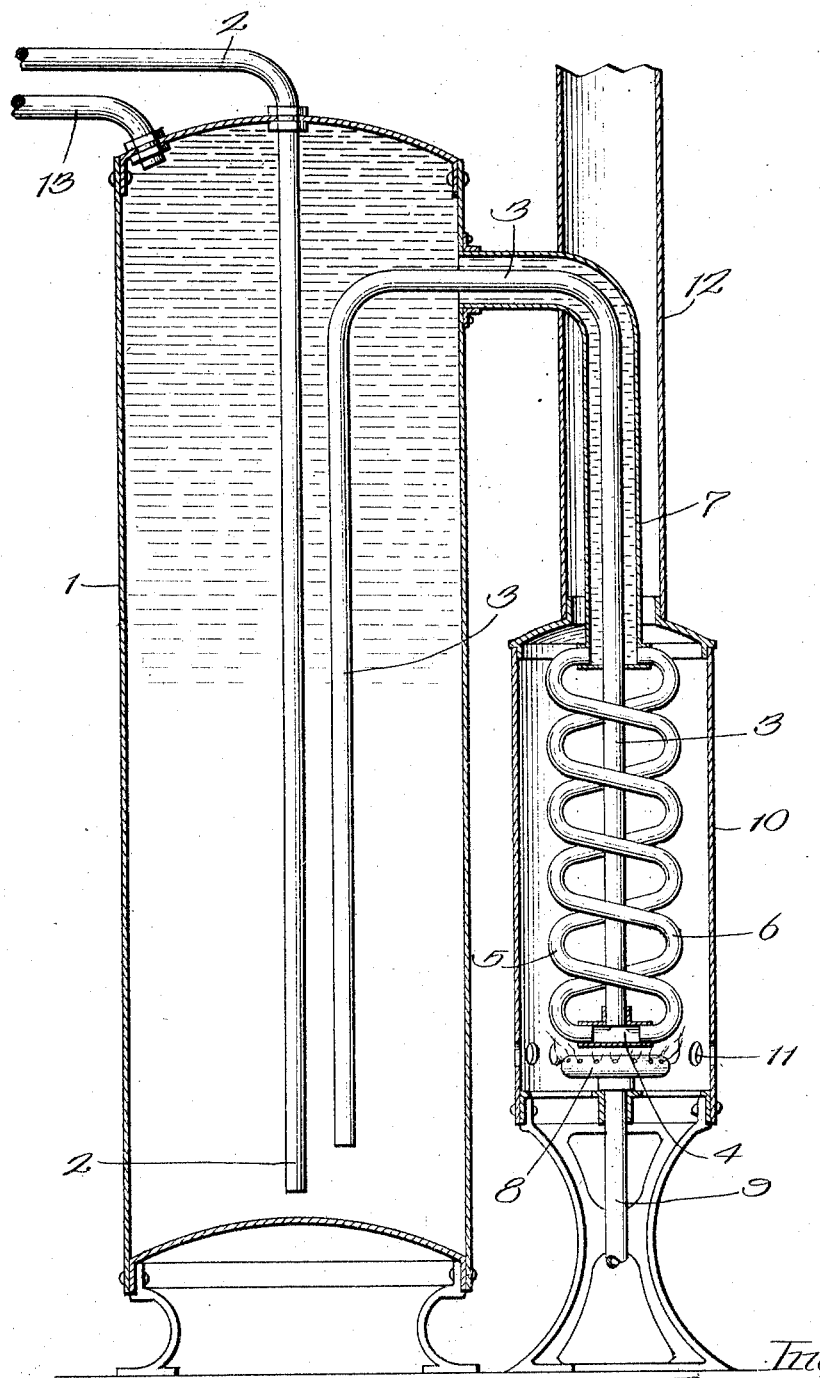

THOMAS F. NOONAN, OF CHICAGO, ILLINOIS.

WATER-HEATING SYSTEM.

1,366,208. Specification of Letters Patent. Patented Jan. 18, 1921.

Application filed October 13, 1919. Serial No. 330,298.

*To all whom it may concern:*

Be it known that I, THOMAS F. NOONAN, citizen of the United States, residing at Chicago, in the county of Cook and State of Illinois, have invented a certain new and useful Improvement in Water-Heating Systems, of which the following is a full, clear, concise, and exact description.

My invention relates to water heating systems and has a number of objects and advantages in view. The water heating system of my invention may readily be employed in connection with a city water supply system. The component elements thereof, in the preferred embodiment of the invention, are so interrelated that the water passing therethrough for the purpose of being heated is subject to the heat of previously heated water except in the portion of the equipment where the water is subject to the action of a heating flame, there preferably being also an arrangement whereby the heated water is subject to the heat of the products of combustion of the water heating flame. This result is desirably accomplished by passing at least a portion of the hot water supply pipe through the bore of a flue through which the products of combustion are discharged.

I will explain my invention more fully by reference to the accompanying drawing which shows a vertical sectional view of a water heating plant that is inclusive of the invention in its preferred embodiment.

The illustrated tank 1 is of common type, being of elongated cylindrical shape disposed in an upright position. The invention is not to be limited, however, to the shape of this tank. Water that is to be heated is introduced into the tank, through a cold water supply pipe 2, from any suitable source, as for example the piping of a city water supply system. This pipe 2 terminates within about three inches of the bottom of the tank 1, at which point cold water enters the tank to keep it filled. The cold water passes from the tank through the pipe 3 which terminates within about six inches from the bottom of the tank. In the arrangement illustrated sediment falling into the bottom of the tank 1 will not pass out through the pipe 3 to the heater. The pipe 3 passes upwardly within the tank and issues through the side thereof near the upper end of the tank and thereafter passes downwardly to the T-fitting 4, the T-fitting connecting the pipe 3 with its preferably coiled branches 5 and 6, in which branches the stream of water that may be flowing through the pipe 3 is divided into two streams to increase the facility with which heat may reach the water which is passed through the pipes 3, 5 and 6 for the purpose of being heated. The upper ends of the pipe branches 5 and 6 communicate with the interior of a hot water supply pipe 7 that is sealed at its lower end except for the connection of the pipe branches 5 and 6 therewith and which discharges at its upper end into the tank 1.

In the preferred embodiment of the invention the cold water pipe 3 passes through the bore of the pipe 7 so that the hot water in the latter pipe will take part in heating the cold water flowing downwardly in the pipe 3 to the T-fitting 4.

Heat is preferably applied to the lower end of the piping portion 4, 5, 6, as for example by means of a gas burner 8 suitably supplied with gas flowing through the gas pipe 9. A gas flame may be suitably controlled, the manner of its control forming no essential part of my invention.

I have illustrated a jacket 10 which houses the burner 8, this jacket being perforated at 11 for the passage of air to the interior thereof to support combustion at the burner, the jacket desirably being elsewhere closed except at its upper end where it is connected with the outlet flue 12 for the products of combustion from the burner 8. In the preferred embodiment of the invention the hot water supply pipe 7 has a considerable portion of its length within the bore of the flue 12 so that the hot water within the pipe 7 may be further subject to the heat of the products of combustion ascending from the burner and passing through the flue or at least such products of combustion may be effective to prevent material reduction of the temperature of the water in the pipe 7.

The cycle of water heating operations includes the incoming passage of cold water through the supply pipe 2 to the bottom of the tank 1 (the down coming water being subject to the temperature of the partially heated water within the tank), the discharge of cool water from the bottom of the tank into the lower end of the pipe 3, the conveyance of the water by the pipe 3 toward the upper end of the tank (the water rising in the pipe 3 being subject to the increasing temperature of the water in said tank), the further conveyance of the water in the pipe 3 through the hot water conveying supply pipe 7 where the water in the pipe 3 is further subject to the temperature of heated water, the discharge of the water from the main pipe portion 3 into the T-fitting 4, at which latter place the water divides into two streams that are conveyed upwardly by the coiled pipe branches 5 and 6, the heated water passing from the upper ends of these pipe branches into the hot water supply pipe 7 that conveys the hot water to the upper end of the tank 1.

The hot water is supplied to the house system from the tank 1 through the service pipe 13. City water pressure serves to maintain the water in the tank and in all of the piping described under a pressure which is sufficient to establish the flow of the hot water through the pipe 13 whenever any faucets supplied by this pipe are opened. When such faucets are closed the water is stationary except for such local agitation as may result from the action of the burner in case the burner flame is not reduced when there is no hot water flowing from the tank. When any faucet is open, circulation of water follows from the pipe 2, where the water is in a cold condition, to the pipe 13, where the water is hot, by way of the piping 3, 4, 5, 6 and 7 as hitherto described.

The assembly of the heater of my invention with a water tank is very simple, it being only required to provide a hole near the upper end of the tank with which one end of the pipe 7 is connected and through which hole the pipe 3 also passes. In the installing process, in case the tank happens to be full of water, only a few gallons of its water need be withdrawn from the tank to bring its level below the discharge end of the pipe 7 whereafter the parts of the equipment illustrated in the drawing may readily be assembled.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

1. A water heating system including a tank for receiving water to be heated and from which heated water may be discharged; a cold water supply pipe passing into the upper portion of the tank and extending through the tank and terminating near the bottom thereof; a pipe communicating with the upper portion of the tank for discharging hot water therefrom; a pipe for conveying water from the tank to heat the water, this pipe terminating at the bottom of the tank, passing upwardly in the tank, and issuing from the upper portion of the tank to the exterior thereof, this latter pipe being divided into coiled branches through which water passes therefrom in divided streams; a hot water supply pipe with which the discharge end of said pipe branches are connected, the pipe portion which leads water to be heated from the tank passing through the bore of said hot water supply pipe; a jacket inclosing the aforesaid coiled pipe branches; a burner within the jacket for heating the water in said pipe branches; and a flue communicating with the upper end of the jacket for discharging products of combustion therefrom, a portion of the aforesaid hot water supply pipe passing through the bore of the flue.

2. A water heating system including a tank for receiving water to be heated and from which heated water may be discharged; a cold water supply pipe passing into the upper portion of the tank and extending through the tank and terminating near the bottom thereof; a pipe communicating with the upper portion of the tank for discharging hot water therefrom; a pipe for conveying water from the tank to heat the water, this pipe terminating at the bottom of the tank, passing upwardly in the tank, and issuing from the upper portion of the tank to the exterior thereof; a hot water supply pipe with which the discharge end of the latter pipe is connected, the pipe portion which leads water to be heated from the tank passing through the bore of said hot water supply pipe; a jacket inclosing the outer lower end portion of the pipe that conveys water from the tank; a burner within the jacket for heating the water in the latter pipe; and a flue communicating with the upper end of the jacket for discharging products of combustion therefrom, a portion of the aforesaid hot water supply pipe passing through the bore of the flue.

In witness whereof, I hereunto subscribe my name this ninth day of October A. D., 1919.

THOMAS F. NOONAN.